United States Patent
Ishikawa (10) Patent No.: US 10,989,081 B2
(45) Date of Patent: Apr. 27, 2021

(54) BLOW-BY GAS TREATMENT DEVICE FOR INTERNAL COMBUSTION ENGINE

(71) Applicant: TOYOTA JIDOSHA KABUSHIKI KAISHA, Toyota (JP)

(72) Inventor: Masami Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/733,345

(22) Filed: Jan. 3, 2020

(65) Prior Publication Data

US 2020/0263577 A1 Aug. 20, 2020

(30) Foreign Application Priority Data

Feb. 15, 2019 (JP) .............................. JP2019-025917

(51) Int. Cl.
*F01M 13/04* (2006.01)
*F16B 31/00* (2006.01)

(52) U.S. Cl.
CPC ............. *F01M 13/04* (2013.01); *F16B 31/00* (2013.01)

(58) Field of Classification Search
CPC .... F01M 13/00; F01M 13/04; F01M 13/0405; F01M 2013/0038; F02M 35/10222; F02D 2250/08; F16B 31/00
See application file for complete search history.

(56) References Cited

U.S. PATENT DOCUMENTS

| 3,595,124 | A | * | 7/1971 | Lindstrand | F16B 31/021 411/2 |
| 6,978,773 | B2 | * | 12/2005 | Hunter | F02M 35/116 123/572 |
| 7,063,078 | B2 | * | 6/2006 | Dees | F02M 35/10222 123/572 |
| 8,011,353 | B2 | * | 9/2011 | Sagata | F01M 13/0416 123/572 |
| 2014/0290634 | A1 | * | 10/2014 | Slaughter | F01M 13/0416 123/573 |
| 2016/0201620 | A1 | * | 7/2016 | Yano | F02M 35/10078 123/184.27 |
| 2019/0316500 | A1 | * | 10/2019 | Miyanaga | F01M 13/0011 |

FOREIGN PATENT DOCUMENTS

| JP | 2009-150351 A | 7/2009 |
| JP | 2010-121537 A | 6/2010 |
| JP | 2013-160134 A | 8/2013 |
| JP | 2018-100608 A | 6/2018 |

* cited by examiner

*Primary Examiner* — Grant Moubry
(74) *Attorney, Agent, or Firm* — Oblon, McClelland, Maier & Neustadt, L.L.P.

(57) ABSTRACT

A blow-by gas treatment device for an internal combustion engine includes: a positive crankcase ventilation (PCV) separator configured to be fastened to the internal combustion engine with a plurality of bolts; and one of a single sealant or a plurality of sealants configured to seal gas leakage of blow-by gas from a gap between the internal combustion engine and the PCV separator; wherein the plurality of bolts includes at least one break head bolt and three or more unbreakable head bolts, the unbreakable head bolt being a bolt in which a bolt head is not separated even when a fastening torque corresponding to a tightening torque applied to the break head bolt is applied to the bolt head.

4 Claims, 10 Drawing Sheets

BLOW-BY GAS TREATMENT DEVICE FOR INTERNAL COMBUSTION ENGINE

CROSS-REFERENCE TO RELATED APPLICATION

This application is based upon and claims the benefit of priority of the prior Japanese Patent Application No. 2019-025917, filed on Feb. 15, 2019, the entire contents of which are incorporated herein by reference.

TECHNICAL FIELD

The present disclosure relates to a blow-by gas treatment device for an internal combustion engine.

BACKGROUND

There is known blow-by gas treatment for treating unburned gas (hereinafter referred to as "blow-by gas") leaked from a combustion chamber to a crankcase through gaps between cylinder inner walls and piston rings during operation of the internal combustion engine, and returning the treated gas to an intake system of the internal combustion engine. It is known that the blow-by gas treatment is implemented using an oil separator (e.g. see Patent Document 1: Japanese Laid-open Patent Publication No. 2009-150351).

It is known to provide a positive crankcase ventilation (PCV) separator that removes oil mist in the blow-by gas, and to fasten a fastening portion of the PCV separator to a head cover of the internal combustion engine with bolts (e.g. see Patent Document 2: Japanese Laid-open Patent Publication No. 2013-160134). In addition, it is known that a sealant having a diameter slightly larger than each of a plurality of gas holes included in the oil separator is provided only around each of the holes. It is also known that the oil separator is fixedly mounted on an engine block using the bolts (e.g. see Patent Document 3: Japanese Laid-open Patent Publication No. 2018-100608).

SUMMARY

As described above, the PCV separator or the oil separator (hereinafter simply referred to as "PCV separator") is fastened to an engine component such as the head cover or the engine block with bolts. For this reason, it is difficult to remove the PCV separator from the engine component. In addition, the sealant is provided around each of the plurality of gas holes included in the PCV separator. Therefore, the sealing performance between the engine component and the PCV separator is also ensured. However, there is room for improvement in achieving both of difficulty at the time of removing the PCV separator, and ensuring the sealing performance.

It is an object of the present disclosure to suppress a decrease in the sealing performance and make it more difficult to remove the PCV separator.

The above object is achieved by a blow-by gas treatment device for an internal combustion engine including: a positive crankcase ventilation (PCV) separator configured to be fastened to the internal combustion engine with a plurality of bolts; and one of a single sealant or a plurality of sealants configured to seal gas leakage of blow-by gas from a gap between the internal combustion engine and the PCV separator; wherein the plurality of bolts includes at least one break head bolt and three or more unbreakable head bolts, the unbreakable head bolt being a bolt in which a bolt head is not separated even when a fastening torque corresponding to a tightening torque applied to the break head bolt is applied to the bolt head.

In the above configuration, the break head bolt and at least two of the unbreakable head bolts may be arranged linearly, the at least two of the unbreakable head bolts may be provided at positions sandwiching the plurality of sealants, and the break head bolt may be provided at a position sandwiched by the plurality of sealants.

In the above configuration, the break head bolt and at least two of the unbreakable head bolts may be arranged linearly along a part of the single sealant, and the break head bolt may be provided at a position sandwiched by the at least two of the unbreakable head bolts.

In the above configuration, the number of break head bolts may be less than that of unbreakable head bolts.

DETAILED DESCRIPTION

Hereinafter, a description will be given of embodiment of the present disclosure with reference to attached drawings.

First Embodiment

Figure 1:
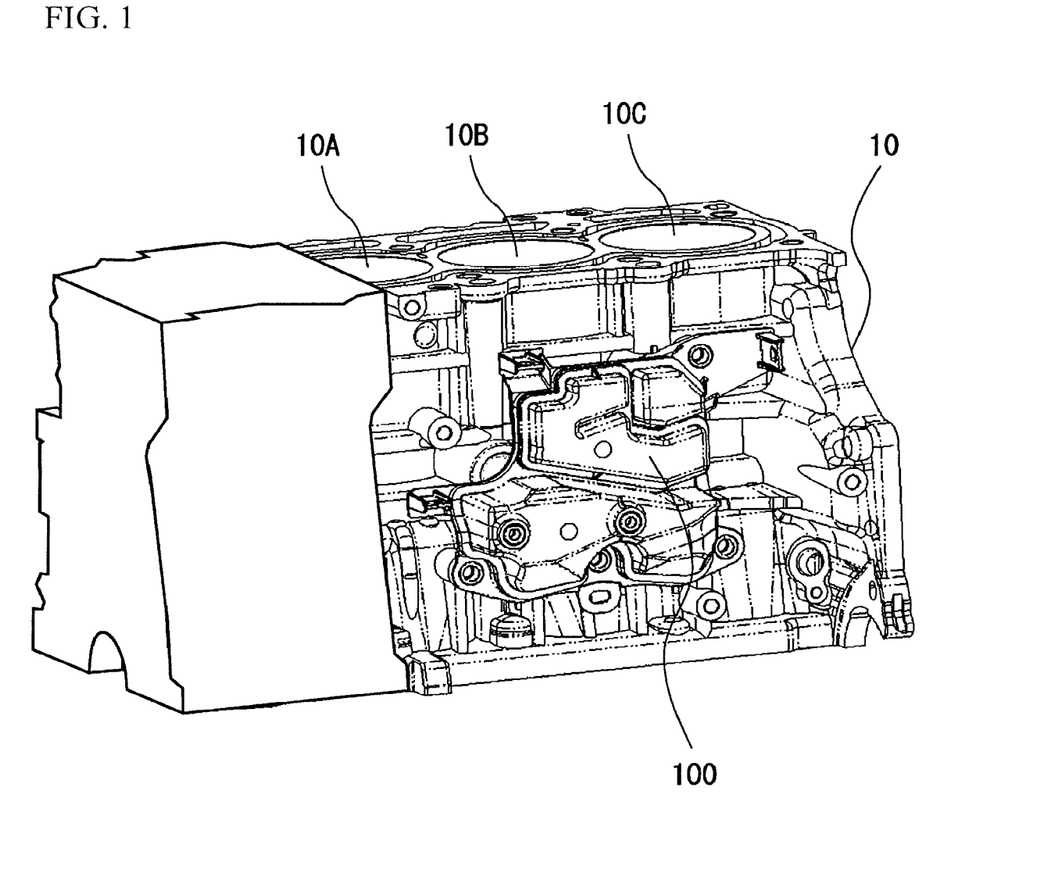
FIG. 1 is a perspective view illustrating an example of a blow-by gas treatment device according to a first embodiment.
Figure 2:
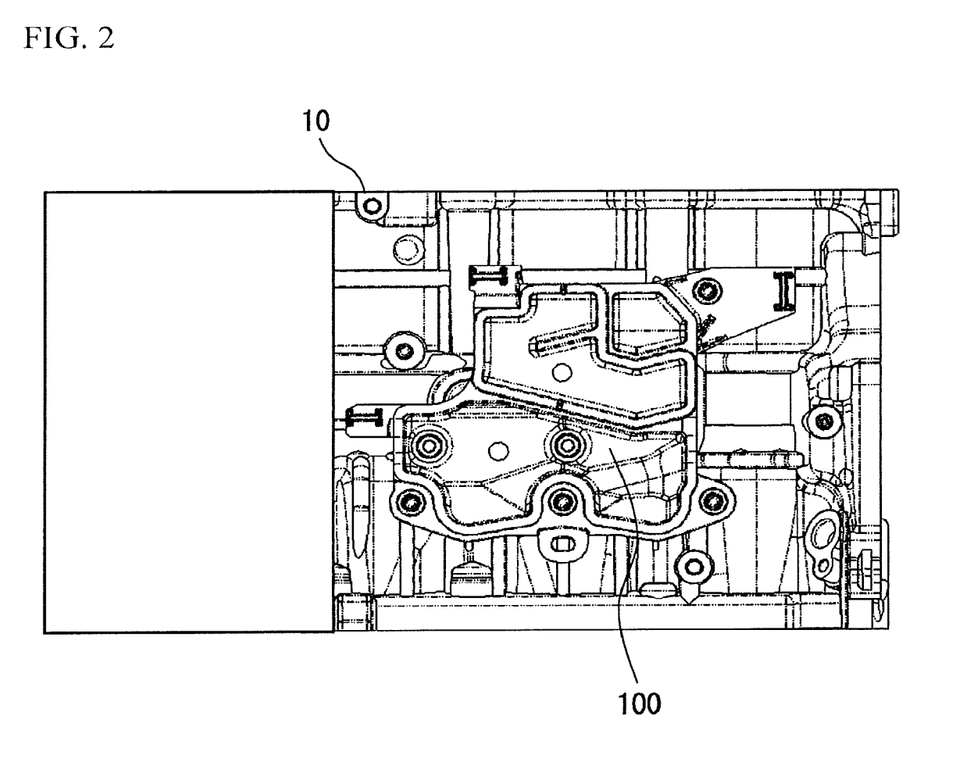
FIG. 2 is a side view illustrating an example of the blow-by gas treatment device according to the first embodiment.

FIG. 1 is a perspective view illustrating an example of a blow-by gas treatment device 100 according to a first embodiment. FIG. 2 is a side view illustrating an example of the blow-by gas treatment device 100 according to the first embodiment. As illustrated in FIGS. 1 and 2, the blow-by gas treatment device 100 according to the first embodiment is mounted on a side wall of a cylinder block 10 which is one of components constituting an in-line engine. More specifically, the blow-by gas treatment device 100 is mounted on the side wall along an arrangement direction of a plurality of cylinders 10A, 10B, 10C arranged in series. In FIGS. 1 and 2, a part of the cylinder block 10 is omitted.

Next, a description will be given of the details of the blow-by gas treatment device 100 with reference to FIGS. 3A to 4B.

Figure 3A:
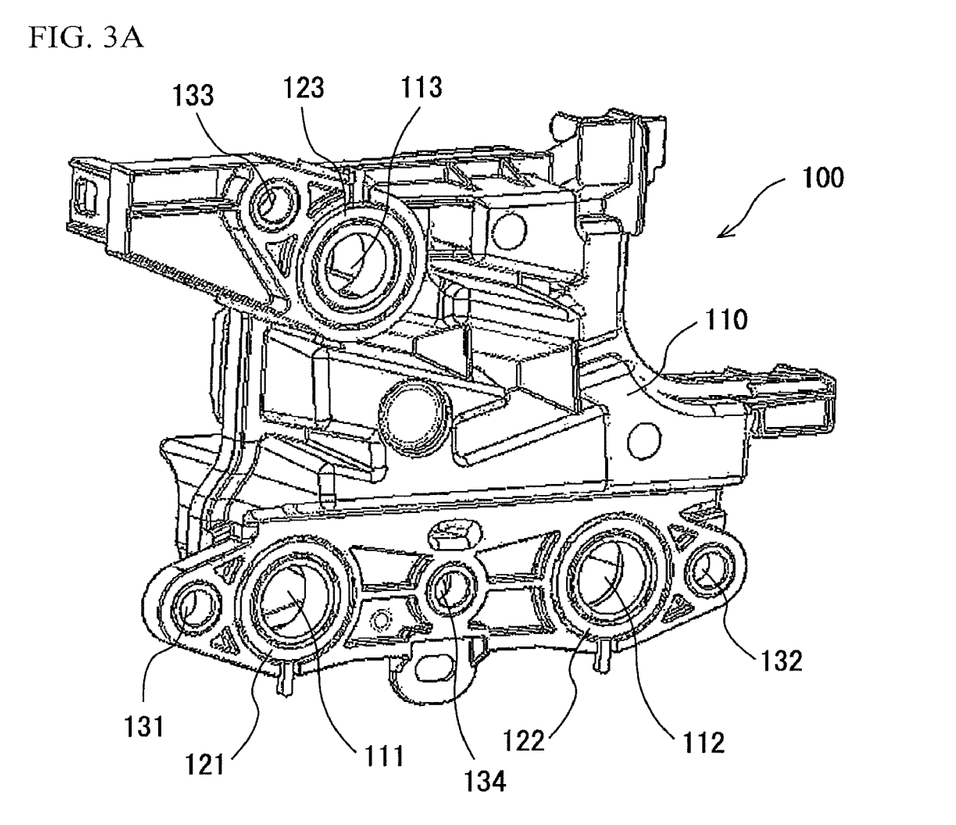
FIG. 3A is a perspective view illustrating an example of a back side of the blow-by gas treatment device.
Figure 3B:
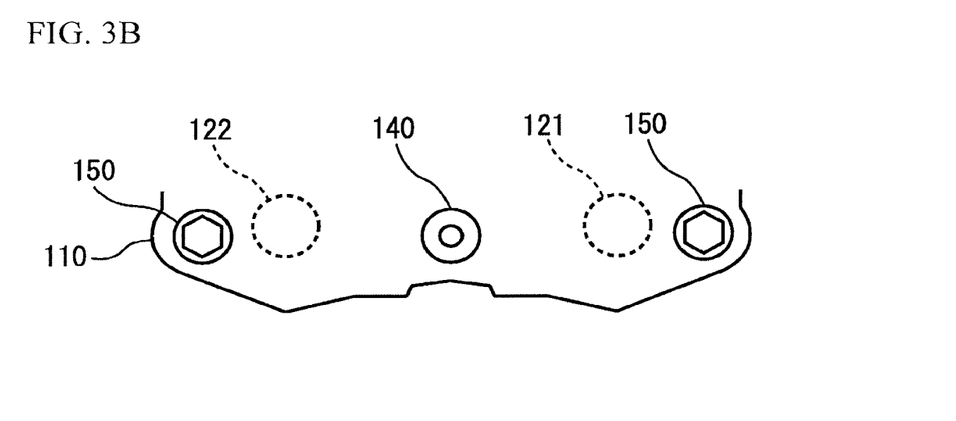
FIG. 3B is a view for explaining an example of the fastening of a PCV separator.
Figure 4A:
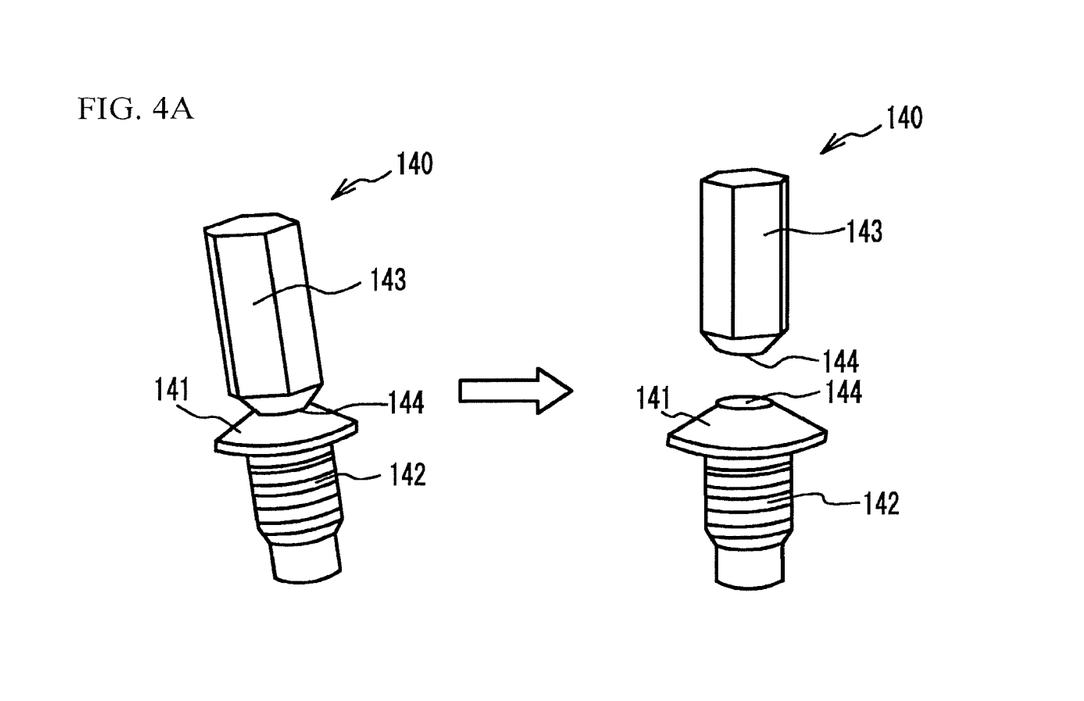
FIG. 4A is a perspective view illustrating an example of a break head bolt.
Figure 4B:
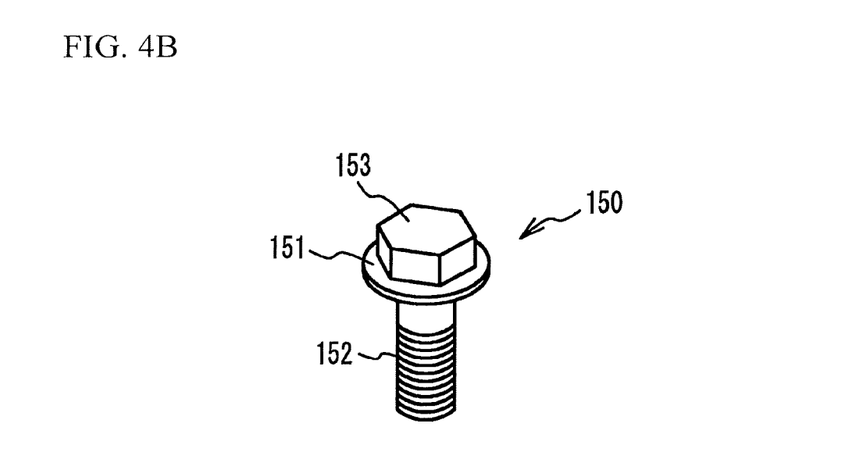
FIG. 4B is a perspective view illustrating an example of a flange bolt.

FIG. 3A is a perspective view illustrating an example of a back side of the blow-by gas treatment device 100. FIG. 3B is a view for explaining an example of the fastening of a PCV separator 110. FIG. 4A is a perspective view illustrating an example of a break head bolt 140. FIG. 4B is a perspective view illustrating an example of a flange bolt 150. The blow-by gas treatment device 100 includes the PCV separator 110 as illustrated in FIG. 3A. The PCV separator 110 separates oil from oil mist in blow-by gas and removes the oil mist in the blow-by gas. The PCV separator 110 returns the blow-by gas from which the oil mist has been removed to an intake system of the cylinder block 10. Here, the PCV separator 110 may return the blow-by gas from which the oil mist has been removed to an intake system of an engine component different from the cylinder block 10.

The PCV separator 110 includes a first gas hole 111 and a second gas hole 112 that introduce the blow-by gas into the PCV separator 110. The PCV separator 110 includes a third gas hole 113 that discharges the blow-by gas to the outside of the PCV separator 110. That is, the PCV separator 110 discharges the blow-by gas from which the oil mist has been removed to an intake system of the cylinder block 10 through the third gas hole 113.

As illustrated in FIG. 3A, the blow-by gas treatment device 100 includes a first sealant 121, a second sealant 122 and a third sealant 123. Each of the first sealant 121, the second sealant 122 and the third sealant 123 is a gasket including a ring portion, and is attached to the PCV separator 110. The diameter of the first sealant 121 and the diameter of the first gas hole 111 are different from each other, and the diameter of the first sealant 121 is larger than that of the first gas hole 111. Similarly, the diameter of the second sealant 122 is larger than that of the second gas hole 112, and the diameter of the third sealant 123 is larger than that of the third gas hole 113. The first sealant 121 seals the gas leakage of the blow-by gas that flows through the first gas hole 111. The second sealant 122 seals the gas leakage of the blow-by gas that flows through the second gas hole 112. The third sealant 123 seals the gas leakage of the blow-by gas that flows through the third gas hole 113. In FIGS. 1 and 2, the first sealant 121, the second sealant 122 and the third sealant 123 are not illustrated since they are all hidden by the PCV separator 110.

Here, the PCV separator 110 includes a first through hole 131, a second through hole 132, a third through hole 133 and a fourth through hole 134, as illustrated in FIG. 3A. Although details will be described later, a plurality of bolts are inserted one by one into the first through hole 131, the second through hole 132, the third through hole 133, and the fourth through hole 134, respectively. The first through hole 131, the second through hole 132 and the fourth through hole 134 except for the third through hole 133 are arranged linearly. Particularly, the fourth through hole 134 is arranged between the first through hole 131 and the second through hole 132.

The fourth through hole 134 is located between the first sealant 121 and the second sealant 122. The first through hole 131, the second through hole 132 and the third through hole 133 are located at different locations from the fourth through hole 134. The first through hole 131, the second through hole 132 and the third through hole 133 are located at the corners of the PCV separator 110 or places corresponding to the corners thereof (hereinafter simply referred to as "corners"). In other words, the first through hole 131, the second through hole 132 and the third through hole 133 are located in the vicinity of the first sealant 121, the second sealant 122 and the third sealant 123, respectively.

The break head bolt 140 illustrated in FIG. 4A is inserted into the fourth through hole 134. In FIG. 3A, the break head bolt 140 is inserted from a back side of a paper to a front side thereof. Therefore, the break head bolt 140 is provided at a position sandwiched by the first sealant 121 and the second sealant 122, i.e., located between the first sealant 121 and the second sealant 122, as illustrated in FIG. 3B. The break head bolt 140 is sometimes called a break-off bolt. The break head bolt 140 includes a flattened conical flange portion 141, a shaft portion 142 formed integrally with a lower side of the flange portion 141, and a hexagonal column-shaped bolt head portion 143 formed integrally with an upper side of the flange portion 141, as illustrated in the left side of FIG. 4A. An upper end portion of the flange portion 141 and a lower end portion of the bolt head portion 143 are connected by a circular cutting portion 144 having a smaller diameter than the shaft portion 142.

Since the break head bolt 140 includes the hexagonal column-shaped bolt head portion 143, the shaft portion 142 can be rotated using a tool such as a spanner or a wrench. However, when a tightening torque with respect to the bolt head portion 143 exceeds a certain fastening torque, the cutting portion 144 is broken and the bolt head portion 143 is separated from the flange portion 141 as illustrated in the right side of FIG. 4A. As a result, the flange portion 141 and the shaft portion 142 of the break head bolt 140 remain. That is, the PCV separator 110 is fastened to the cylinder block 10 by the break head bolt 140 in which the bolt head portion 143 has been separated. Since the tool cannot be engaged with the flange portion 141, it is difficult to remove the PCV separator 110 from the cylinder block 10. Thus, the PCV separator 110 can be fastened to the cylinder block 10 by the break head bolt 140 inserted into the fourth through hole 134.

On the other hand, the flange bolt 150 illustrated in FIG. 4B is inserted into each of the first through hole 131, the second through hole 132 and the third through hole 133. In FIG. 3A, the flange bolt 150 is also inserted from the back side of the paper to the front side thereof. Therefore, the two flange bolts 150 inserted into the first through hole 131 and the second through hole 132 are provided at positions sandwiching the first sealant 121 and the second sealant 122, as illustrated in FIG. 3B. The flange bolt 150 includes a disk-shaped flange portion 151 called a flange, a shaft portion 152 formed integrally with a lower side of the flange portion 151, and a hexagonal column-shaped bolt head portion 153 formed integrally with an upper side of the flange portion 151, as illustrated in FIG. 4B. Since the flange bolt 150 does not include the cutting portion 144 unlike the break head bolt 140, the bolt head portion 153 is not separated from the flange portion 151 even when the tightening torque with respect to the bolt head portion 153 exceeds the above-mentioned fastening torque. Accordingly, it is possible to achieve strong fastening between the cylinder block 10 and the PCV separator 110, and to secure the sealing performance by the first sealant 121 and the second sealant 122. The flange bolt 150 is an example of an unbreakable head bolt. The unbreakable head bolt is not limited to the flange bolt 150 as long as the bolt head portion 153 is not broken even when a constant tightening torque is applied to the bolt head portion 153. Thus, the cylinder block 10 and the PCV separator 110 can be fastened by the flange bolts 150 inserted into the first through hole 131, the second through hole 132 and the third through hole 133, respectively.

Next, a description will be given of the details of the cylinder block 10 with reference to FIGS. 5 and 6.

Figure 5:
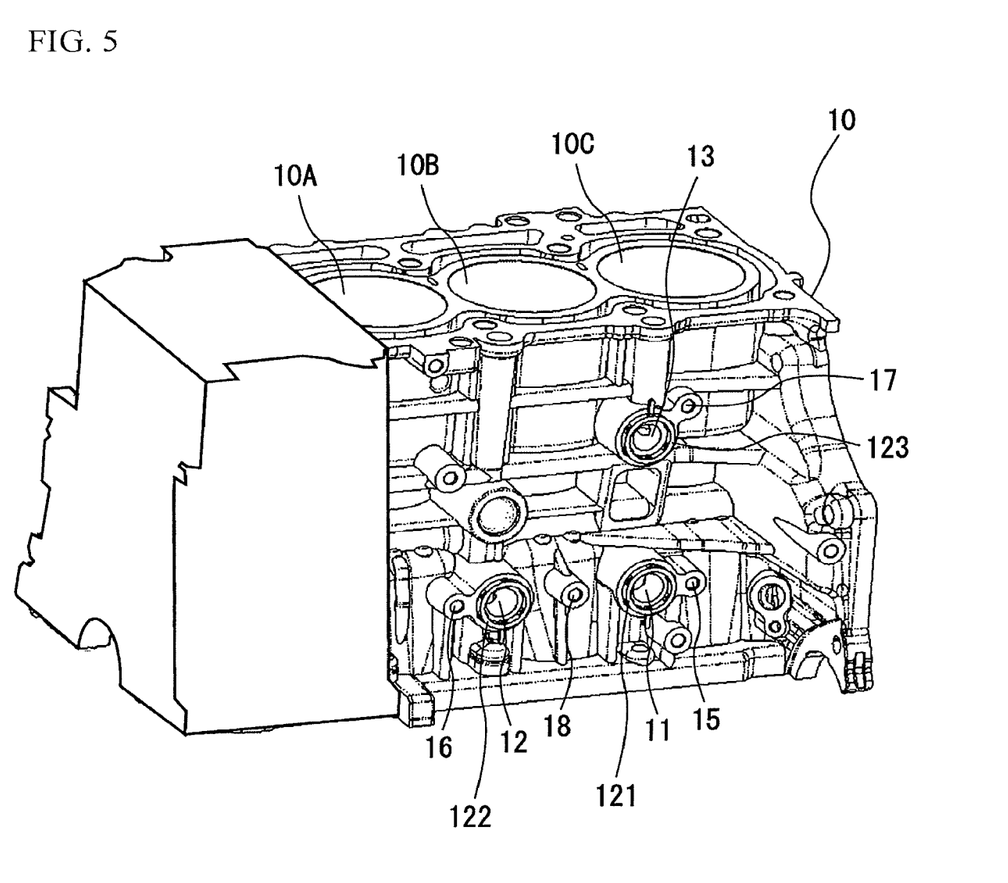
FIG. 5 is a perspective view illustrating an example of a cylinder block according to the first embodiment.

FIG. 5 is a perspective view illustrating an example of the cylinder block 10 according to the first embodiment. FIG. 6 is a side view illustrating the example of the cylinder block 10 according to the first embodiment. FIGS. 5 and 6 illustrate the cylinder block 10 before the blow-by gas treatment device 100 is mounted.

As described with reference to FIG. 3A, the blow-by gas treatment device 100 includes the PCV separator 110, the first sealant 121, the second sealant 122 and the third sealant 123. The first sealant 121, the second sealant 122 and the third sealant 123 are mounted on the PCV separator 110. For this reason, in principle, the first sealant 121, the second sealant 122 and the third sealant 123 are not represented in the cylinder block 10 before the blow-by gas treatment device 100 is mounted. However, FIGS. 5 and 6 exceptionally illustrate the first sealant 121, the second sealant 122 and the third sealant 123 in order to clearly explain a fastening position of the PCV separator 110 with respect to the cylinder block 10.

Figure 6:
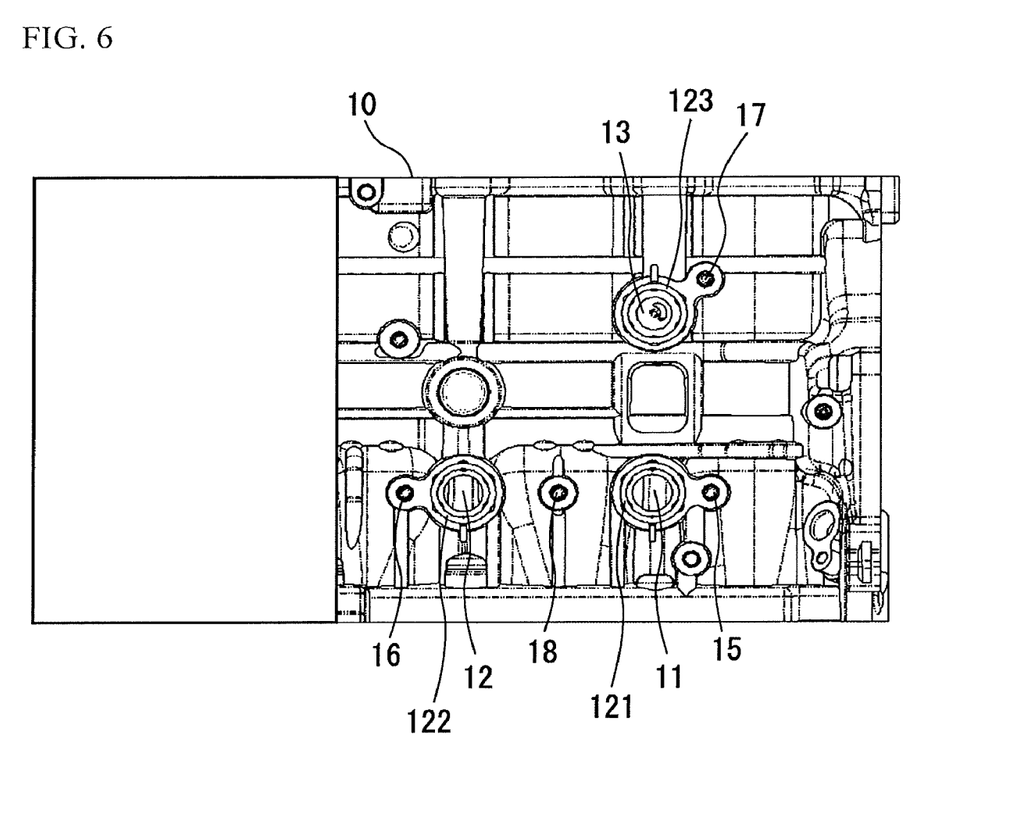
FIG. 6 is a side view illustrating the example of the cylinder block according to the first embodiment.

As illustrated in FIGS. 5 and 6, the cylinder block 10 includes a first opening 11 and a second opening 12 on the side wall thereof. Both of the first opening 11 and the second opening 12 communicate with the crankcase through gas passages provided inside the side wall. Therefore, both of the first opening 11 and the second opening 12 discharge the blow-by gas inside the crankcase to the outside of the cylinder block 10. Further, the cylinder block 10 includes a third opening 13 on the side wall thereof. The third opening 13 communicates with the intake system of the cylinder block 10 through another gas passage provided in the side wall. Therefore, when the blow-by gas from which the oil mist has been removed exists outside the cylinder block 10, the third opening 13 introduces the blow-by gas into the intake system of the cylinder block 10.

As shown in FIGS. 5 and 6, the first sealant 121 provided on the PCV separator 110 closely adheres around the first opening 11. The second sealant 122 provided on the PCV separator 110 closely adheres around the second opening 12. The third sealant 123 provided on the PCV separator 110 closely adheres around the third opening 13. Therefore, the first opening 11 and the first gas hole 111 (see FIG. 3A) of the PCV separator 110 communicate with each other through the first sealant 121. The second opening 12 and the second gas hole 112 (see FIG. 3A) of the PCV separator 110 communicate with each other through the second sealant 122. The third opening 13 and the third gas hole 113 (see FIG. 3A) of the PCV separator 110 communicate with each other through the third sealant 123. The PCV separator 110 is mounted on the cylinder block 10 so as to ensure the above-mentioned relationship.

As shown in FIGS. 5 and 6, the cylinder block 10 includes a first fastening groove 15, a second fastening groove 16, a third fastening groove 17 and a fourth fastening groove 18 on the side wall thereof. The first fastening groove 15 is provided in the vicinity of the first opening 11. The second fastening groove 16 is provided in the vicinity of the second opening 12. The third fastening groove 17 is provided in the vicinity of the third opening 13. The fourth fastening groove 18 is provided between the first opening 11 and the second opening 12.

As described above, since the first opening 11 and the first gas hole 111 communicate with each other, the first fastening groove 15 corresponds to the first through hole 131 (see FIG. 3A) of the PCV separator 110. Similarly, since the second opening 12 and the second gas hole 112 communicate with each other, the second fastening groove 16 corresponds to the second through hole 132 (see FIG. 3A) of the PCV separator 110. Since the third opening 13 and the third gas hole 113 communicate with each other, the third fastening groove 17 corresponds to the third through hole 133 (see FIG. 3A) of the PCV separator 110. Based on the correspondence described above, the fourth fastening groove 18 corresponds to the fourth through hole 134 of the PCV separator 110 (see FIG. 3A).

Therefore, when the shaft portion 142 of the break head bolt 140 is inserted into the fourth through hole 134 and the shaft portion 142 of the break head bolt 140 is coupled with the fourth fastening groove 18, the PCV separator 110 is fastened to the side wall of the cylinder block 10 by the break head bolt 140. When the fastening of the PCV separator 110 is completed, the bolt head portion 143 of the break head bolt 140 is separated from the flange portion 141, and hence it is difficult to remove the PCV separator 110 from the cylinder block 10.

In this case, a fastening force (i.e., a shaft force) might be reduced because the break head bolt 140 is used. However, when the shaft portion 152 of the flange bolt 150 is inserted into the first through hole 131 and the shaft portion 152 of the flange bolt 150 is coupled with the first fastening groove 15, the PCV separator 110 is fastened to the side wall of the cylinder block 10 also by the flange bolt 150. Similarly, when the shaft portion 152 of the flange bolt 150 is inserted into the second through hole 132 and the shaft portion 152 of the flange bolt 150 is coupled with the second fastening groove 16, the PCV separator 110 is fastened to the side wall of the cylinder block 10 also by the flange bolt 150. When the shaft portion 152 of the flange bolt 150 is inserted into the third through hole 133 and the shaft portion 152 of the flange bolt 150 is coupled with the third fastening groove 17, the PCV separator 110 is fastened to the side wall of the cylinder block 10 also by the flange bolt 150.

In this way, the flange bolts 150 are used together with the break head bolt 140, and hence it is possible to suppress the decrease in the sealing performance of the first sealant 121, the second sealant 122 and the third sealant 123 due to the decrease in the fastening force by the break head bolt 140. In particular, the break head bolt 140 is used for the fastening of the fourth through hole 134 and the fourth fastening groove 18 positioned between the first sealant 121 and the second sealant 122, and it is therefore assumed that the first sealant 121 and the second sealant 122 have a larger influence due to the decrease in the sealing performance than the third sealant 123. However, since the flange bolts 150 are used for the fastening of the first through hole 131 and the first fastening groove 15 and the fastening of the second through hole 132 and the second fastening groove 16, the influence due to the decrease in the sealing performance can be suppressed.

As described above, the blow-by gas treatment device 100 according to the first embodiment includes the PCV separator 110, the first sealant 121, the second sealant 122 and the third sealant 123. Each of the first sealant 121, the second sealant 122 and the third sealant 123 seals the gas leakage of the blow-by gas from a gap between the cylinder block 10 and the PCV separator 110. The PCV separator 110 is fastened to the cylinder block 10 by the plurality of bolts. In particular, the plurality of bolts includes one break head bolt 140 and three flange bolts 150. The flange bolt 150 is the bolt in which the bolt head portion 153 is not separated from the flange portion 151 even when the fastening torque corresponding to the tightening torque applied to the break head bolt 140 is applied to the bolt head portion 153.

Thereby, it is possible to suppress a decrease in the sealing performance and make it more difficult to remove the PCV separator 110. Although the break head bolt 140 is often more expensive than the flange bolt 150, the above-mentioned effects can be realized at a lower cost as compared with the case where all of the flange bolts 150 are replaced to the break head bolt 140. That is, when the number of the break head bolts 140 is less than the number of the flange bolts 150, the above-mentioned effects can be realized at the lower cost as compared with the case where only the break head bolts 140 are used for the PCV separator 110 without using the flange bolts 150.

Second Embodiment

Figure 7:
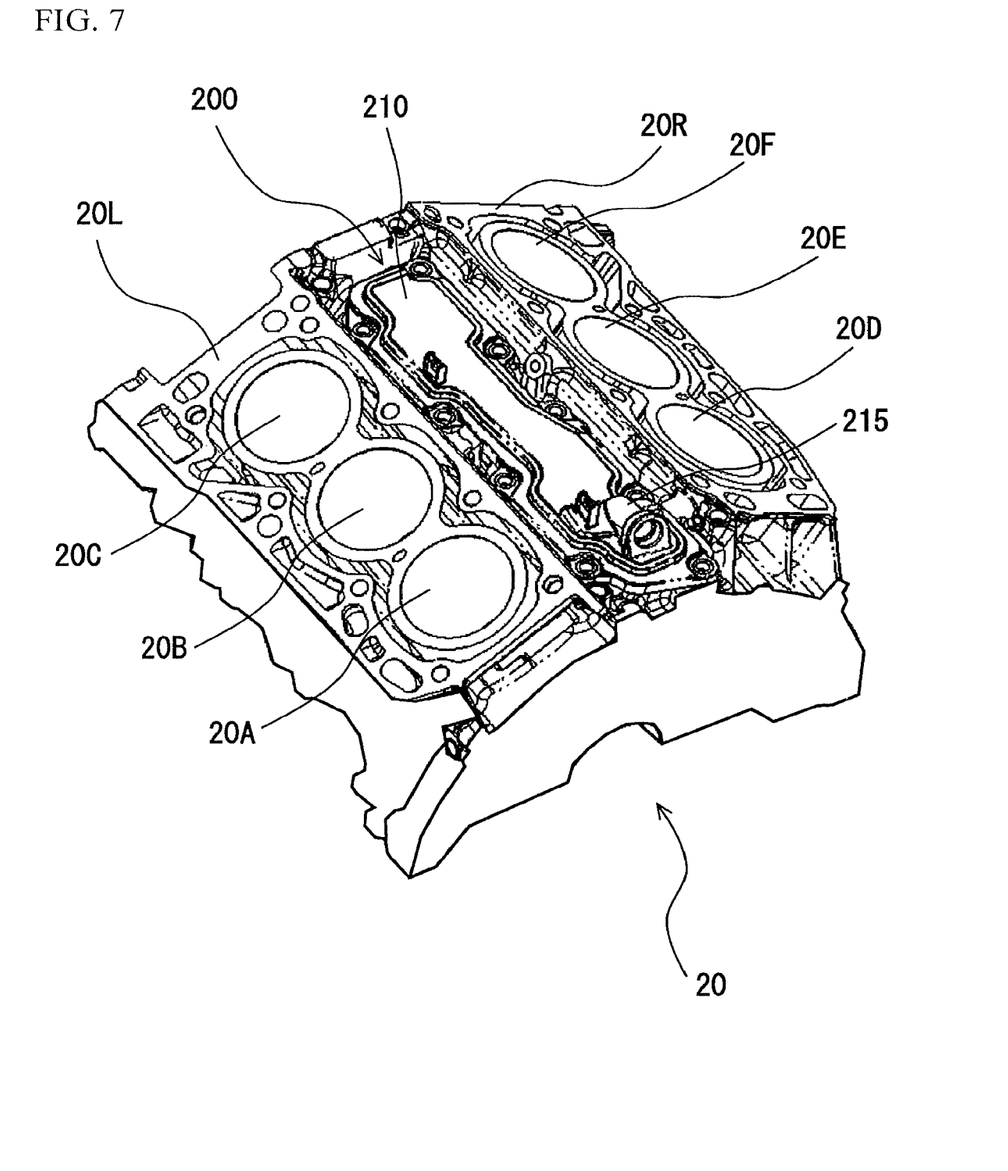
FIG. 7 is a perspective view illustrating an example of a blow-by gas treatment device according to a second embodiment.
Figure 8:
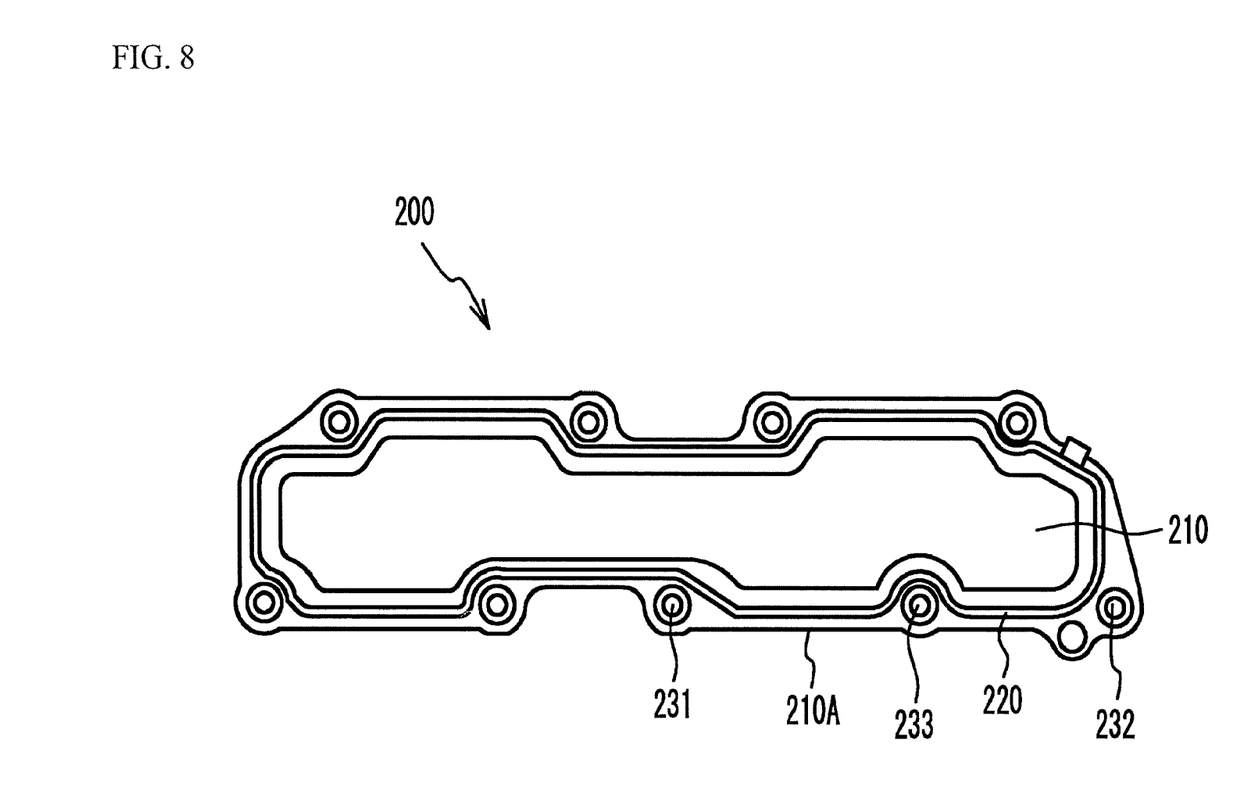
FIG. 8 is a plan view illustrating a back side of the blow-by gas treatment device according to the second embodiment.
Figure 9:
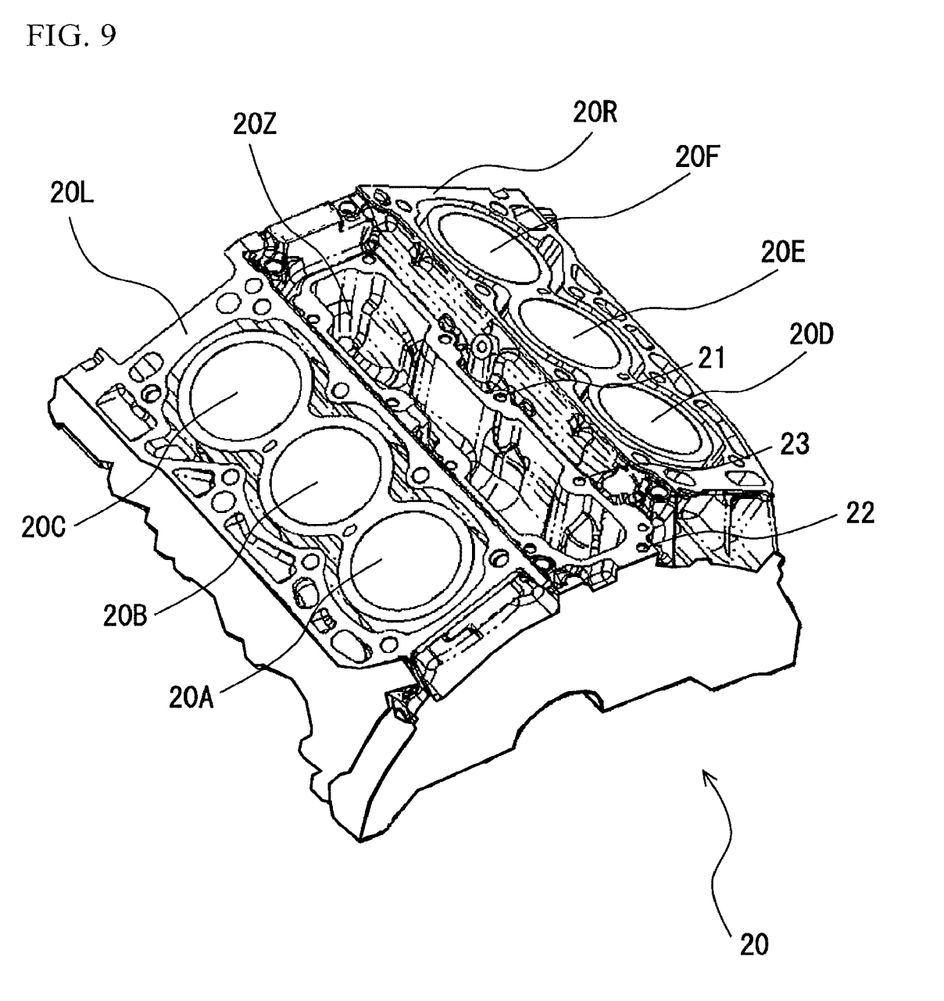
FIG. 9 is a perspective view illustrating an example of a cylinder block according to the second embodiment.

Next, a description will be given of a second embodiment with reference to FIGS. 7 to 9. FIG. 7 is a perspective view illustrating an example of a blow-by gas treatment device 200 according to the second embodiment. FIG. 8 is a plan view illustrating a back side of the blow-by gas treatment device 200 according to the second embodiment. FIG. 9 is a perspective view illustrating an example of a cylinder block 20 according to the second embodiment. FIG. 9 illustrates the cylinder block 20 before the blow-by gas treatment device 200 is mounted.

As illustrated in FIG. 7, the blow-by gas treatment device 200 according to the second embodiment is mounted between a left bank 20L and a right bank 20R of the cylinder block 20 which is one of the components constituting a V-type turbo engine. The left bank 20L includes three cylinders 20A, 20B and 20C, and the right bank 20R includes three cylinders 20D, 20E and 20F. That is, the blow-by gas treatment device 200 is mounted between six cylinders 20A, 20B, 20C, 20D, 20E, and 20F arranged in a V-shape in two right and left rows. In FIG. 7, a part of the cylinder block 20 is omitted.

As illustrated in FIG. 7, the blow-by gas treatment device 200 includes a PCV separator 210, and a mounting hole 215 for mounting a PCV valve. The mounting hole 215 is connected to an intake system of the cylinder block 20. On the other hand, as illustrated in FIG. 8, the blow-by gas treatment device 200 includes one endless sealant (specifically, a gasket) 220 on a side opposite to a side where the mounting hole 215 is provided. The endless sealant 220 is provided along an outer edge 210A of the PCV separator 210.

Here, as illustrated in FIG. 9, the cylinder block 20 includes a cavity portion 20Z that is recessed like a tub between the left bank 20L and the right bank 20R. The blow-by gas flows into the cavity portion 20Z from the crankcase (not shown). Since the blow-by gas treatment device 200 is mounted so as to cover the cavity portion 20Z, the above-mentioned endless sealant 220 seals the gas leakage of the blow-by gas that has flowed into the cavity portion 20Z. In the cavity portion 20Z, the oil is separated from the blow-by gas. The blow-by gas from which the oil has been separated is discharged from the PCV valve mounted on the mounting hole 215 (see FIG. 7) of the blow-by gas treatment device 200. On the other hand, the oil separated from the blow-by gas is discharged from an oil outlet (not shown) provided on the side wall of the cavity portion 20Z.

As illustrated in FIG. 8, the PCV separator 210 includes a plurality of through holes including a fifth through hole 231, a sixth through hole 232, and a seventh through hole 233 between the outer edge 210A and the endless sealant 220. Although the details will be described later, a plurality of bolts are inserted into the plurality of through holes, respectively. The fifth through hole 231, the sixth through hole 232, and the seventh through hole 233 are arranged linearly. Particularly, the seventh through hole 233 is arranged between the fifth through hole 231 located at the center of the PCV separator 210 in a longitudinal direction of the PCV separator 210 and the sixth through hole 232 located at the corner of the PCV separator 210.

The break head bolt 140 (see FIG. 4A) is inserted into the seventh through hole 233. In FIG. 8, the break head bolt 140 is inserted from the back side of the paper to the front side thereof. Therefore, the PCV separator 210 is fastened to the cylinder block 20 by the break head bolt 140 in which the bolt head portion 143 has been separated, as in the first embodiment. Since the tool cannot be engaged with the flange portion 141, it is difficult to remove the PCV separator 210 from the cylinder block 20. Thus, the cylinder block 20 and the PCV separator 210 can be fastened by the break head bolt 140 inserted into the seventh through hole 233.

On the other hand, the flange bolts 150 are inserted into the fifth through hole 231 and the sixth through hole 232 (see FIG. 4B), respectively. In FIG. 8, the flange bolts 150 are also inserted from the back side of the paper to the front side thereof. Therefore, the strong fastening between the cylinder block 20 and the PCV separator 210 can be realized, and the sealing performance by the endless sealant 220 can be secured. Thus, the cylinder block 20 and the PCV separator 210 can be fastened by the flange bolts 150 inserted into the fifth through hole 231 and the sixth through hole 232, respectively. The flange bolts 150 are inserted into all of the remaining through holes excluding the fifth through hole 231, the sixth through hole 232 and the seventh through hole 233 from the plurality of through holes. However, the break head bolt 140 may be inserted into a part of the remaining through holes.

As illustrated in FIG. 9, the cylinder block 20 includes a fifth fastening groove 21, a sixth fastening groove 22 and a seventh fastening groove 23 between the left bank 20L and the right bank 20R. The fifth fastening groove 21 corresponds to the fifth through hole 231 (see FIG. 8) of the PCV separator 210. The sixth fastening groove 22 corresponds to the sixth through hole 232 (see FIG. 8) of the PCV separator 210. The seventh fastening groove 23 corresponds to the seventh through hole 233 (see FIG. 8) of the PCV separator 210.

Therefore, when the shaft portion 142 of the break head bolt 140 is inserted into the seventh through hole 233 and the shaft portion 142 of the break head bolt 140 is coupled with the seventh fastening groove 23, the PCV separator 210 is fastened between the bank 20L and the right bank 20R of the cylinder block 20 by the break head bolt 140. When the fastening of the PCV separator 210 is completed, the bolt head portion 143 of the break head bolt 140 is separated from the flange portion 141, and hence it is difficult to remove the PCV separator 210 from the cylinder block 20.

In this case, the fastening force (i.e., the shaft force) might be reduced because the break head bolt 140 is used. However, when the shaft portion 152 of the flange bolt 150 is inserted into the fifth through hole 231 and the shaft portion 152 of the flange bolt 150 is coupled with the fifth fastening groove 21, the PCV separator 210 is fastened between the bank 20L and the right bank 20R of the cylinder block 20 also by the flange bolt 150. Similarly, when the shaft portion 152 of the flange bolt 150 is inserted into the sixth through hole 232 and the shaft portion 152 of the flange bolt 150 is coupled with the sixth fastening groove 22, the PCV separator 210 is fastened between the bank 20L and the right bank 20R of the cylinder block 20 also by the flange bolt 150.

In this way, the flange bolts 150 are used together with the break head bolt 140, and hence it is possible to suppress the decrease in the sealing performance of the endless sealant 220 due to the decrease in the fastening force by the break head bolt 140.

As described above, the blow-by gas treatment device 200 according to the second embodiment includes the PCV separator 210 and the single endless sealant 220. The endless sealant 220 seals the gas leakage of the blow-by gas from a gap between the cylinder block 20 and the PCV separator 210. The PCV separator 210 is fastened to the cylinder block 20 by the plurality of bolts. In particular, the plurality of bolts includes one break head bolt 140 and at least three flange bolts 150. The flange bolt 150 is the bolt in which the bolt head portion 153 is not separated from the flange portion 151 even when the fastening torque corresponding to the tightening torque applied to the break head bolt 140 is applied to the bolt head portion 153. Thereby, it is possible to suppress a decrease in the sealing performance and make it more difficult to remove the PCV separator 210. In the second embodiment, the V-type turbo engine has been described as an example. However, in the case of a V-type engine without a turbo function, a PCV separator having the same function as the function of the PCV separator 210 may be fastened to and mounted on a head cover of the left bank 20L.

Third Embodiment

Figure 10A:
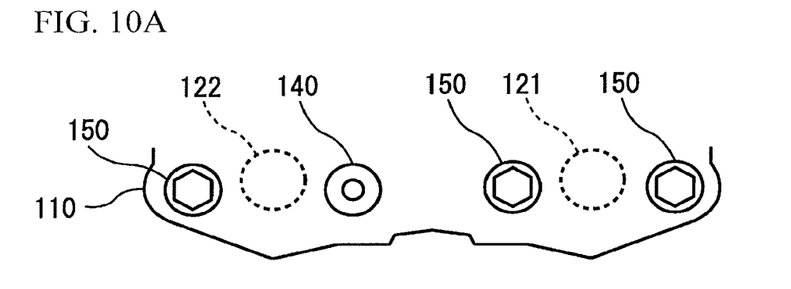
FIGS. 10A to 10D are views for explaining another examples of the fastening of the PCV separator.

Next, a description will be given of a third embodiment with reference to FIGS. 10A to 10D. FIGS. 10A to 10D are views for explaining another examples of the fastening of the PCV separator 110. Since the break head bolt 140 needs to be positioned between the first sealant 121 and the second sealant 122 as described in the first embodiment, the single flange bolt 150 may be located between the first sealant 121 and the second sealant 122 in addition to the single break head bolt 140 as illustrated in FIG. 10A, for example. The PCV separator 110 may be mounted on the cylinder block 10 in such a fastening form. Even in such a fastening form, it is possible to suppress the decrease in the sealing performance and make it more difficult to remove the PCV separator 110.

Figure 10B:
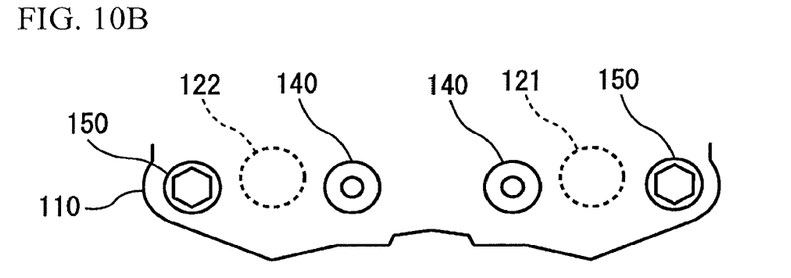
Figure 10C:
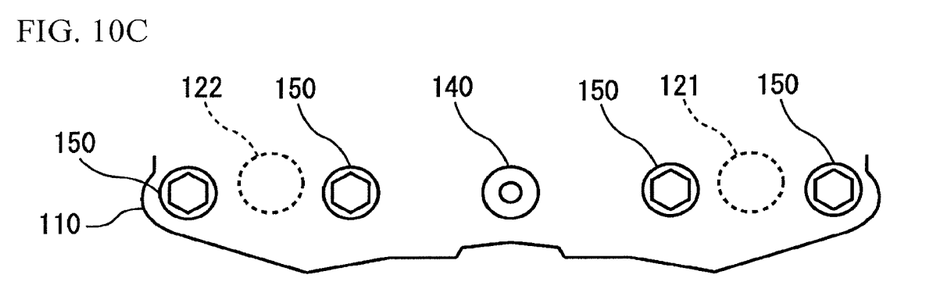
Figure 10D:
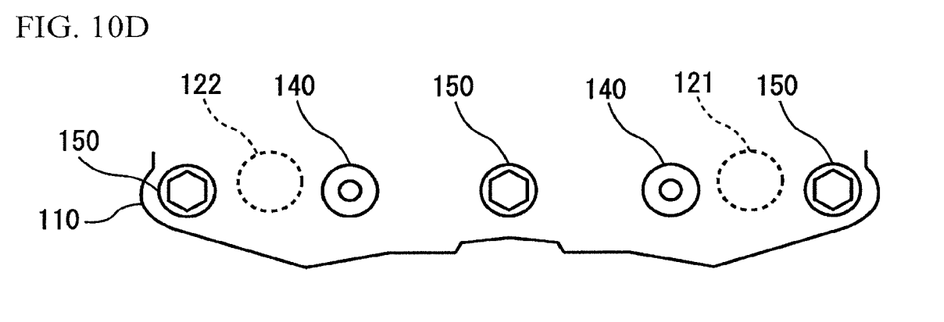

Similarly, since the break head bolt 140 needs to be positioned between the first sealant 121 and the second sealant 122, two break head bolts 140 may be located between the first sealant 121 and the second sealant 122 as illustrated in FIG. 10B. In addition, the single break head bolt 140 and the two flange bolts 150 sandwiching the single break head bolt 140 may be located between the first sealant 121 and the second sealant 122 as illustrated in FIG. 10C. Further, the single flange bolt 150 and the two break head bolts 140 sandwiching the single flange bolt 150 may be located between the first sealant 121 and the second sealant 122 as illustrated in FIG. 10D. Even in the fastening forms described above, it is possible to suppress the decrease in the sealing performance and make it more difficult to remove the PCV separator 110. As with the third embodiment, various fastening forms can be adopted also for the PCV separator 210 described in the second embodiment.

Although some embodiments of the present disclosure have been described in details, the present disclosure is not limited to the specific embodiments but may ne varied or changed within the scope of the present disclosure as claimed. For example, in the above-mentioned first embodiment, the cylinder block 10 of the in-line engine which is one of the internal combustion engines has been described as an example of a fastening destination of the PCV separator 110. Further, in the above-mentioned second embodiment, the cylinder block 20 of the V-type engine which is one of the internal combustion engines has been described as an example of the fastening destination of the PCV separator 210. However, the fastening destinations of the PCV separator 110 and the PCV separator 210 are not particularly limited to the cylinder blocks 10 and 20.

For example, the fastening destinations of the PCV separator 110 and the PCV separator 210 may be a cylinder head, a chain case or the like. When the cylinder head is used as the fastening destinations of the PCV separator 110 and the PCV separator 210, the PCV separator 110 and the PCV separator 210 may be provided on the side wall of the cylinder head. When the chain case is used as the fastening destinations of the PCV separator 110 and the PCV separator 210, the PCV separator 110 and the PCV separator 210 may be provided on any one of the surfaces of the chain case.

Further, in the above-mentioned embodiments, a regular shape sealant having a fixed shape such as a gasket has been described as an example of the sealant. However, an irregular shape sealant having no fixed shape may be used as the sealant. Examples of the irregular shape sealant include FIPG (Formed In Place Gasket: liquid gasket) or the like.

What is claimed is:

1. A blow-by gas treatment device for an internal combustion engine comprising:
   a positive crankcase ventilation (PCV) separator configured to be fastened to the internal combustion engine with a plurality of bolts; and
   a plurality of sealants configured to seal gas leakage of blow-by gas from a gap between the internal combustion engine and the PCV separator,
   wherein the plurality of bolts includes at least one break head bolt and three or more unbreakable head bolts, the unbreakable head bolt being a bolt in which a bolt head is not separated even when a fastening torque corresponding to a tightening torque applied to the break head bolt is applied to the bolt head, and
   wherein the break head bolt and at least two of the unbreakable head bolts are arranged linearly, the at least two of the unbreakable head bolts are provided at positions sandwiching the plurality of sealants, and the break head bolt is provided at a position sandwiched by the plurality of sealants.

2. The blow-by gas treatment device for the internal combustion engine as claimed in claim 1, wherein the number of break head bolts is less than that of unbreakable head bolts.

3. A blow-by gas treatment device for an internal combustion engine comprising:
   a positive crankcase ventilation (PCV) separator configured to be fastened to the internal combustion engine with a plurality of bolts; and
   a single sealant configured to seal gas leakage of blow-by gas from a gap between the internal combustion engine and the PCV separator,
   wherein the plurality of bolts includes at least one break head bolt and three or more unbreakable head bolts, the unbreakable head bolt being a bolt in which a bolt head is not separated even when a fastening torque corresponding to a tightening torque applied to the break head bolt is applied to the bolt head, and wherein the break head bolt and at least two of the unbreakable head bolts are arranged linearly along a part of the single sealant, and the break head bolt is provided at a position sandwiched by the at least two of the unbreakable head bolts.

4. The blow-by gas treatment device for the internal combustion engine as claimed in claim 3, wherein the number of break head bolts is less than that of unbreakable head bolts.

* * * * *